Patented Oct. 26, 1937

2,097,225

UNITED STATES PATENT OFFICE 2,097,225

STABILIZING CHOCOLATE MILK AND OTHER MILK PRODUCTS AND PROCESS OF MAKING SAME

Harland C. Green, Donald E. Clark, and Raymond P. Mann, San Diego, and Bennett Preble, National City, Calif., assignors to Kelco Company, Los Angeles, Calif., a corporation of Delaware No Drawing. Application November 19, 1935, Serial No. 50,606. Renewed June 3, 1937

15 Claims. (Cl. 99—25)

Our invention is an improvement in manufactured milk products such as ice cream, chocolate milk, cheese and emulsified food products and the process for making same, and the principal objects of the invention are to provide for a more completely stabilized product which still retains the fresh flavor of the milk and/or cream, the same containing vegetable stabilizers consisting of an alginate and another or other stabilizers as hereinafter more fully explained.

Heretofore manufactured milk products such as ice cream, chocolate milk and cheeses have usually been made with gelatine, starch, vegetable gums such as tragacanth, Irish moss, carob bean flour, acacia gum, other gum products or alginates. When such materials are added to dairy products to be frozen, they retard the growth of ice crystals during freezing and subsequent storage. When added to chocolate milk they prevent the cocoa fibers from settling out and when added to cheese prevent the material from separating or "wheying off."

With the exception of the alginates all of these products impart a heaviness to the taste of the product so that it does not taste as do the freshly made products without any stabilizer added. Such stabilized products have the effect of dulling the appetite too quickly so that the amount ordinarily eaten is less than is the case with the pure, unstabilized products. Besides this general objection each of the above mentioned stabilizers and related stabilizing materials have certain individual disadvantages when compared with alginates which do not result in an ideal product.

Thus, frozen dairy products stabilized with gelatine do not melt as completely, lack the delicacy of flavor, and fineness of texture as found in such products stabilized with alginate as is explained in the Howard J. Lucas and Harland C. Green application on Ice cream, ice milk mixture and process for making same Serial No. 23,134 (Case 8163) filed May 23, 1935.

On the other hand the alginate stabilized ice cream or other frozen dairy products do not have the body usually found in ice cream and this is objectionable to some people.

We have found that when frozen dairy products are stabilized with a mixture of alginate and Irish moss that the resulting products have more body and do not melt as rapidly as when alginate only is used. Furthermore, such products when compared with frozen dairy products stabilized with gelatine are superior because they contain no animal products, melt without leaving a residue, have finer crystals of ice so that the ice cream remains smooth even when aged in dealer cabinets, and at the same time have a clean refreshing taste and flavor in the mouth. When this product is compared with dairy products stabilized with gums such as carob bean flour, we find that it melts without leaving a residue, and lacks the slimy taste characteristic of this stabilizer.

By varying the ratio between the amount of alginate and Irish moss used in ice cream the speed of the melting is controlled. The more Irish moss used, the slower the melting. Slow melting gives the impression of a richer or higher butter fat ice cream and one which is more chewy. This is highly desirable with certain people.

A typical way to prepare ice cream using the combination of alginate and Irish moss is given below. This formula makes a 12% butter fat ice cream which tastes like a 14% butter fat ice cream made with gelatine as the only stabilizer:

| | Pounds |
|---|---|
| Cream (40 per cent butter fat) | 267.0 |
| Milk (3.5 per cent butter fat) | 388.0 |
| Condensed skim milk (30 per cent serum solids) | 192.0 |
| Sugar | 150.0 |
| Alginate | 1.25 |
| Irish moss | 1.25 |

The cream, milk and condensed skim milk are placed in a pasteurizing vat and heated to 160 degrees Fahrenheit. The alginate and Irish moss, ground to a convenient size for easy solution, are then added with the sugar and stirred until dissolved. The mix is then cooled and frozen with typical equipment designed for this use.

The alginate used in this particular example was made in accordance with the methods disclosed in the Howard J. Lucas and Harland C. Green application, Serial #23,134, filed May 23, 1935, Case #8163. Such an alginate as stated in this case is sold under the trade name Dariloid and contains approximately 40 to 50% high viscosity sodium alginate, about 5% trisodium phosphate or the equivalent, the balance being sugar and dextrine. Dariloid is milk soluble due to the presence of the trisodium phosphate or its equivalent and the sugar and dextrine enable a particle of Dariloid to dissolve more readily in water or milk.

The Irish moss was prepared by cooking some commercial bleached Irish moss in water to give approximately a 2% solution and then filtering or otherwise separating the insoluble portion from the soluble portion and drying the soluble portion. Any one of several well known drying methods such as drum drying, sun drying, spray drying, etc. could be used.

When untreated Irish moss is used for making ice cream, we find we may successfully do this by first boiling the Irish moss in water, then straining off the insoluble portion and adding this solution to the mix. When we do this we change the ratio of the condensed milk and the whole milk in the mix to maintain the same serum solids. When alginates which are not milk soluble are used, we first dissolve the alginates in warm water and then add this solution to the ice cream mix.

Chocolate milk stabilized with alginates needs to be held an hour before bottling in order to prevent a formation of a gel and mottled appearance in the bottled drink. By mottling we mean the appearance of white blotches or streaks in the milk which give the milk the appearance of having soured. Furthermore, alginates when used alone are critical and a slight excessive amount of alginates will cause "lifting" in the drink or the formation of a white ring around the bottom of the bottle. Too little alginate will cause settling and great care must be exercised by the dairy to get the product just right. This is not always possible in commercial dairies with the result that at times whole batches of chocolate milk must be dumped.

We have found that by mixing a water or milk soluble edible alginate product in the dry state with dried Irish moss prepared so that it is also water or milk soluble that we are able to use this mixture in manufacturing chocolate milk drinks to obtain a product which does not have to be held before bottling as it does not mottle before reaching the ultimate consumer even under the conditions of wide temperature fluctuations as found in retail stores. Furthermore the presence of the alginate prevents the Irish moss from forming a thick drink resembling a weak gel structure and also the presence of the alginate enables such a small amount of Irish moss to be used that it does not impart an objectionable flavor to the chocolate milk.

One method of preparation of the chocolate milk drink is with the following approximate formula which will give about 100 gallons of product:

| | | |
|---|---|---|
| Cocoloid | lbs | .8 |
| Irish moss | do | .7 |
| Sugar | do | 44.0 |
| Cocoa | do | 8.8 |
| Milk with 2 per cent butterfat | gals | 96 |

The Cocoloid, Irish moss, sugar and cocoa are mixed dry and added to the milk when it reaches a temperature of 160° F. The mixture is stirred at this temperature for 20 to 30 minutes (usually in a pasteurizing vat) and then cooled to 40–50° F. and bottled. The drink may then be delivered to customers, retail stores or held for such delivery at a later time.

This resulting chocolate milk drink does not set to a gel nor does it mottle. It remains suspended and does not settle or develop a cream line even when subjected to temperature fluctuations normally found in the dairy trade. It has a rich refreshing taste when consumed and leaves no disagreeable after taste or film in the mouth. These characteristics result in customers ordering this type of chocolate milk drink regularly week after week rather than as a curiosity to be consumed for a day or two only as usually occurs when the taste of the drink remains too long in the mouth. The improvement of the aforesaid combination of Cocoloid and Irish moss therefore has the following practical advantages over the use of gelatine, starch, alginates, or gums since it provides for the chocolate milk:

(1) A light bodied drink which will keep the cocoa fiber suspended in the milk indefinitely. Starch or gelatine drinks do not keep this cocoa suspended indefinitely unless made to a very heavily bodied drink.

(2) No disagreeable after taste in the mouth. Due to the light body of this drink there is no film of stabilizer remaining in the mouth after drinking this product. Starch and gelatine drinks leave such a film in the mouth.

(3) A drink which may be bottled directly after cooling and will show no mottling even when stored under fluctuating temperature conditions. Alginate drinks require a holding period between cooling and bottling and in spite of this often develop a mottled appearance, particularly during summer weather when milk on delivery wagons becomes heated and is then returned to cold room temperatures for future delivery.

(4) A refreshing taste in which the stabilizer taste is not appreciably discernible. It is not necessary to blank out the stabilizer taste with the use of a lot of flavoring such as vanilla. Irish moss and gums when used by themselves or in conjunction with each other have a distinct characteristic taste which has prevented continued use of chocolate milk drinks when so stabilized. When drinks are stabilized with alginate only no such off taste is noted and it is the combination of the alginate drink, which does not give this taste, with the Irish moss drink which enables us to obtain a product having the fresh taste as found in alginate drinks and the absence of mottling as found in Irish moss drinks, which renders our product novel.

(5) A noncritical procedure. When alginate is used alone as a stabilizer the drink is critical and if a slight excess of the stabilizer is used the cocoa fibers will appear to "lift" and a white layer forms around the bottom of the bottle of chocolate drink. Often mottling also develops. If not enough stabilizer is used the drink will settle. There is very little margin between the minimum and maximum amount of stabilizer and in commercial plants the result is often a partly settled drink or one overstabilized. When Irish moss is used along with alginates we have found that for some reason this critical condition is eliminated and considerable variation may be had with the concentration of the stabilizers used without noticeably affecting the final product. This is of practical value to dairies.

There are several types of alginates which may be successfully used in conjunction with Irish moss to stabilize dairy products. We have found that we may use any water soluble, edible alginate product such as ammonium, sodium, potassium alginate and dissolve this alginate directly in water and then add cocoa to this water solution to form an alginate cocoa syrup which may then be added to milk. The Irish moss and sugar may either be added in the syrup or in the milk. For ice cream mixes this type of alginate is first dissolved in water which is then added to the mix.

We have found that we may specially prepare the alginate as manufactured by the Clark-Green patent application, Serial #4,412, filed January 21, 1935, Case #8133—X, by washing the alginic acid as obtained from this application more thoroughly with hydrochloric acid to obtain an alginic acid practically free of even traces of calcium or iron salts, then incorporating this product with ammonia hydroxide, and/or sodium carbonate, sugar and/or dextrine and drying. We have found that this product is soluble at 145° in milk and may be used in place of the Cocoloid product mentioned above.

In place of the bleached, digested, filtered, dried Irish moss product we have found that we can obtain equally as good results by preparing the Irish moss in several different ways. One of these ways is to take the commercial bleached Irish moss and pulverize it so that it passes through 150 or finer mesh so that when this product is added directly to milk or to syrup the particle size of the insoluble constituents of the Irish moss are not conspicuous in the chocolate milk drink.

We have also found that we may take commercial bleached Irish moss, add water to it to make a paste and then grind this paste to a particle size corresponding to 150 or finer mesh in the dry state so that the particles which do not go into solution are not conspicuous in the chocolate milk drink.

Another method is to wash the Irish moss with acidulated water to remove cold water soluble salts, sea shells, etc., then cook in fresh hot water, filter and dry.

We find that by adding some sugar and/or dextrine or similar substances to the Irish moss liquor prior to drying the rate of solution is enhanced, and also the temperature at which it can go into solution can be lowered.

We have found that we do not need to limit ourselves to the use of the bleached type of Irish moss but prefer to use this type as it has a more pleasing appearance.

We have also found that the addition of sugar and/or dextrine when added to the Irish moss product before drying aids in dissolving the dried material either in water or milk.

The ratio of alginate to Irish moss may also be varied depending on the types being used and the amount of this blend may vary with the amount of milk, depending on whether a completely suspended drink or partially suspended drink is desired. We have found however, that about .09% of Cocoloid, and .08% of Irish moss by weight to the final drink gives the best results as the drink is prefectly suspended, free from mottling and practically free from the typical moss taste.

The Irish moss may be prepared by cooking commercial "bleached Irish moss" with water, filtering or otherwise removing the insoluble constituents and drying the filtrate or clarified solution by any of well known drying methods.

We have furthermore found that in place of Irish moss we may use other products such as Iceland moss, pectin and pectate products, agar, gum tragacanth and other vegetable gums in the same manner in which the Irish moss is used.

Except for tragacanth and other gum products of the gum bassorin type (i. e. swelling but not completely dispersing in water), the products suitable for combination with the alginate in place of Irish moss can be classified generally as materials in which a principal constituent is a highly polymerized derivative of a hexose sugar or sugar acid. Slight variations in the concentrations and procedure required, however, are necessary depending upon the individual gums used.

We claim:—

1. A manufactured dairy product containing milk, a water soluble alginate compound and a water soluble gum.

2. A manufactured dairy product containing milk, a water soluble alginate compound and a water soluble sea moss.

3. A manufactured dairy product containing milk, a water soluble alginate compound and agar.

4. A manufactured dairy product containing milk, a water soluble alginate compound and a pectic compound.

5. A manufactured dairy product containing milk, a water soluble alginate compound and a material containing a highly polymerized derivative of a hexose sugar or hexose sugar acid.

6. A frozen dairy product containing milk, a water soluble alginate compound and a water soluble gum.

7. A frozen dairy product containing milk, a water soluble alginate compound and a water soluble sea moss.

8. A frozen dairy product containing milk, a water soluble alginate compound and agar.

9. A frozen dairy product containing milk, a water soluble alginate compound and a pectic compound.

10. A frozen dairy product containing milk, a water soluble alginate compound and a material containing a highly polymerized derivative of a hexose sugar or hexose sugar acid.

11. The process of manufacturing dairy products containing milk, wherein a milk soluble alignate and milk soluble gum is added to the mix.

12. The process of manufacturing dairy products containing milk, wherein a milk soluble alginate and a sea moss is added to the mix.

13. The process of manufacturing dairy products containing milk, wherein a milk soluble alginate and agar is added to the mix.

14. The process of manufacturing dairy products containing milk, wherein a milk soluble alginate and pectate is added to the mix.

15. The process of manufacturing dairy products containing milk, wherein a milk soluble alginate and a material containing a highly polymerized derivative of hexose sugar or hexose sugar acid is added to the mix.

HARLAND C. GREEN.
DONALD E. CLARK.
RAYMOND P. MANN.
BENNETT PREBLE.